US012613743B2

(12) United States Patent (10) Patent No.: US 12,613,743 B2
Lee et al. (45) Date of Patent: Apr. 28, 2026

(54) METHOD AND TERMINAL FOR SCHEDULING PROCESSORS

(71) Applicant: SEOUL NATIONAL UNIVERSITY R&DB FOUNDATION, Seoul (KR)

(72) Inventors: Youngki Lee, Seoul (KR); Changjin Jeong, Seoul (KR); Jingyu Lee, Seoul (KR); Changmin Jeon, Seoul (KR); Joo Seong Jeong, Seoul (KR); Byung-Gon Chun, Seoul (KR); Donghyun Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 583 days.

(21) Appl. No.: 18/166,578

(22) Filed: Feb. 9, 2023

(65) Prior Publication Data

US 2023/0401091 A1 Dec. 14, 2023

(30) Foreign Application Priority Data

Jun. 9, 2022 (KR) ........................ 10-2022-0070273

(51) Int. Cl.
*G06F 9/48* (2006.01)
*G06F 9/38* (2018.01)
(52) U.S. Cl.
CPC .......... *G06F 9/4881* (2013.01); *G06F 9/3877* (2013.01)
(58) Field of Classification Search
None
See application file for complete search history.

(56) References Cited

U.S. PATENT DOCUMENTS

| | | | | |
|---|---|---|---|---|
| 7,080,379 B2 * | 7/2006 | Brenner | ................. | G06F 9/505 |
| | | | | 718/103 |
| 8,826,280 B1 * | 9/2014 | Robertson | ............ | G06Q 10/103 |
| | | | | 718/100 |
| 9,778,961 B2 * | 10/2017 | Raman | .................. | G06F 9/5066 |
| 11,176,438 B2 | 11/2021 | Yang | | |
| 2017/0075734 A1 * | 3/2017 | Raman | .................. | G06F 9/4881 |
| 2018/0302800 A1 | 10/2018 | O'Shea | | |
| 2020/0249998 A1 * | 8/2020 | Che | ........................ | G06N 20/00 |

(Continued)

FOREIGN PATENT DOCUMENTS

| | | |
|---|---|---|
| EP | 3 792 755 A1 | 3/2021 |
| KR | 10-1666549 B1 | 10/2016 |

(Continued)

OTHER PUBLICATIONS

Extended European Search Report dated Aug. 22, 2023, issued in European Application No. 23162435.4.

(Continued)

*Primary Examiner* — Van H Nguyen
(74) *Attorney, Agent, or Firm* — Sughrue Mion, PLLC

(57) ABSTRACT

A single terminal performs scheduling of processing a request from a plurality of applications by using heterogeneous processors. The single terminal may include an analysis unit partitioning a request from an application in units and generating at least one subgraph, a profiling unit predicting an operation execution time for at least one frequency of at least one processor capable of processing the subgraph, and a scheduler performing scheduling based on a request from the application and the operation execution time.

9 Claims, 10 Drawing Sheets

(56)                        References Cited

U.S. PATENT DOCUMENTS

| | | |
|---|---|---|
| 2021/0056357 A1 | 2/2021 | Zhang et al. |
| 2021/0248003 A1 | 8/2021 | Seok et al. |
| 2021/0256384 A1 | 8/2021 | Wang et al. |
| 2021/0295174 A1 | 9/2021 | Zhang et al. |
| 2021/0390405 A1 | 12/2021 | Choi et al. |
| 2022/0043675 A1* | 2/2022 | Xia ...................... G06F 9/5027 |

FOREIGN PATENT DOCUMENTS

| | | |
|---|---|---|
| KR | 10-2019-0136431 A | 12/2019 |
| KR | 10-2021-0101071 A | 8/2021 |
| KR | 10-2021-0154080 A | 12/2021 |

OTHER PUBLICATIONS

Korean Office Action dated Mar. 29, 2024 in Application No. 10-2022-0070273.

Zhang, et al., "DUET: A Compiler-Runtime Subgraph Scheduling Approach for Tensor Programs on a Coupled CPU-GPU Architecture", IEEE International Parallel Distributed Processing Symposium, 2021 (11 Pages).

Wu, et al. "SwitchFlow: Preemptive Multitasking for Deep Learning", In Middleware, 2021, pp. 146-158 (13 pages).

* cited by examiner

340

Possible Subgraph Sequences

Subgraphs

FIG.  9

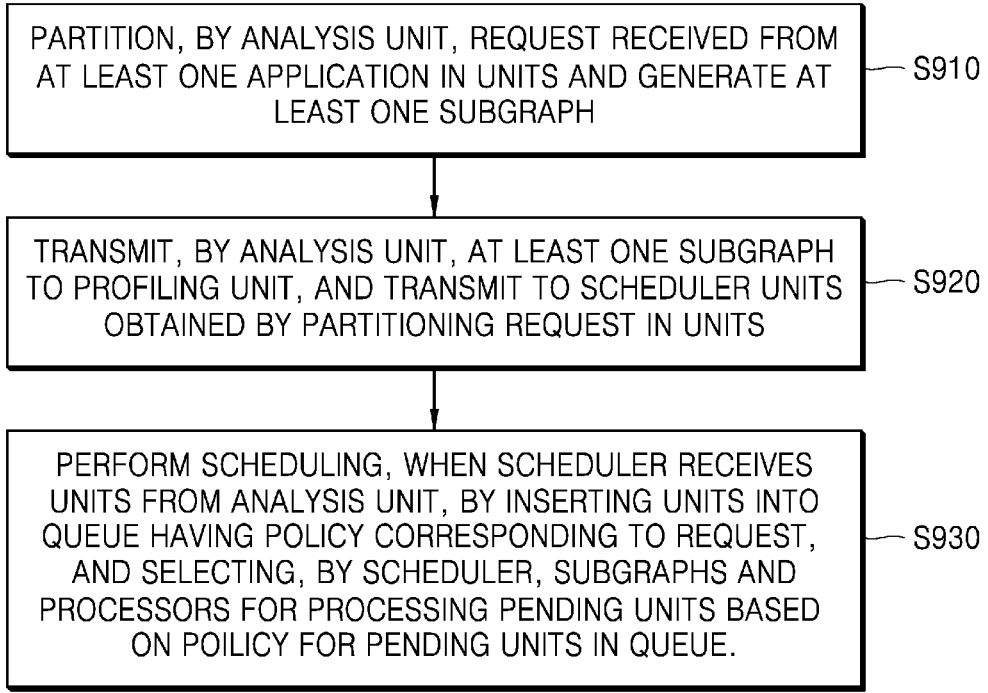

PARTITION, BY ANALYSIS UNIT, REQUEST RECEIVED FROM AT LEAST ONE APPLICATION IN UNITS AND GENERATE AT LEAST ONE SUBGRAPH — S910

TRANSMIT, BY ANALYSIS UNIT, AT LEAST ONE SUBGRAPH TO PROFILING UNIT, AND TRANSMIT TO SCHEDULER UNITS OBTAINED BY PARTITIONING REQUEST IN UNITS — S920

PERFORM SCHEDULING, WHEN SCHEDULER RECEIVES UNITS FROM ANALYSIS UNIT, BY INSERTING UNITS INTO QUEUE HAVING POLICY CORRESPONDING TO REQUEST, AND SELECTING, BY SCHEDULER, SUBGRAPHS AND PROCESSORS FOR PROCESSING PENDING UNITS BASED ON POILICY FOR PENDING UNITS IN QUEUE. — S930

METHOD AND TERMINAL FOR SCHEDULING PROCESSORS

CROSS-REFERENCE TO RELATED APPLICATION

This application is based on and claims priority under 35 U.S.C. § 119 to Korean Patent Application No. 10-2022-0070273, filed on Jun. 9, 2022, in the Korean Intellectual Property Office, the disclosure of which is incorporated by reference herein in its entirety.

BACKGROUND

1. Field

The disclosure relates to a method of performing scheduling when multiple deep neural networks are simultaneously inferred in a terminal using heterogeneous processors.

2. Description of the Related Art

The market for artificial intelligence services, such as computer vision, natural language processing, and virtual reality, using a deep neural network (DNN) model is growing rapidly. However, when several DNNs are simultaneously inferred in a terminal using heterogeneous processors, there is an issue that scheduling is not supported. As a result, an interference phenomenon occurs and there is an issue of resource contention.

In addition, when DNN is inferred by using mobile devices, there is an issue that only processors designated in the early stage are used, and it is difficult to move the processing of computational requests to other processors when the current processor is occupied.

PRIOR ART DOCUMENT

Patent Literature (Patent Literature 1) KR 10-2019-0136431

SUMMARY

Provided is a method of performing scheduling to infer a multiple deep neural network in a terminal. In detail, scheduling is performed such that heterogeneous processors process a deep learning operation from a plurality of applications in a single terminal. In addition, scheduling is performed by using frequency information available in the heterogeneous processors.

Additional aspects will be set forth in part in the description which follows and, in part, will be apparent from the description, or may be learned by practice of the presented embodiments of the disclosure.

According to an aspect of the disclosure, a terminal performing scheduling includes an analysis unit configured to partition a request received from at least one application in units and generate at least one subgraph, a profiling unit receiving the at least one subgraph, and predicting and storing an operation execution time for at least one frequency of at least one processor capable of processing the received subgraph, and a scheduler selecting subgraphs and processors based on a request received from the at least one application and at least one operation execution time stored in each subgraph.

The scheduler may request an operation execution time corresponding to a current frequency of each of the at least one processor to the profiling unit and receive the operation execution time, and selects subgraphs and processors based on predicted operation execution time corresponding to the current frequency.

The scheduler may include a multi-level queue inserting the request received from each of the at least one application after partitioning the request in unit types into a queue having a policy included in the request based on a policy included in the policy; and a scheduling policy unit selecting subgraphs and processors suitable for processing a pending unit with respect to a unit pending in the queue having the policy.

The multi-level queue may include a plurality of queues, and each of the plurality of queues may have a policy, and in the case of several policies, select a policy and a queue according to a preset policy-related priority.

The terminal may include heterogeneous processors, and the heterogeneous processors may include at least two of CPU, NPU, and GPU.

The analysis unit may separate the request into a plurality of units by partitioning in units, derive a plurality of subgraph sequences based on types of at least one processor capable of processing each of the separated plurality of units, and in addition, when there are different units from each other continuously adjacent to each other in the subgraph sequence based on the types of the processors, generate at least one subgraph by combining the different units from each other.

When the different units from each other continuously adjacent to each other in the subgraph sequence are processable by an identical processor, the different units may be combined into the subgraphs It may be possible that an operation in an identical unit is processed by using one identical processor.

The profiling unit may predict and store an operation execution time for each of at least one frequency available to the at least one processor for each of the at least one processor available for each of the subgraphs.

According to another aspect of the disclosure, a method of performing scheduling in a terminal includes generating, by an analysis unit, at least one subgraph by partitioning a request received from at least one application in units, transmitting, by the analysis unit, the at least one subgraph to a profiling unit, and transmitting, by a scheduler, a plurality of units, in which the request has been partitioned, and scheduling including inserting the plurality of units received from the scheduler into a queue having a policy corresponding to the request, and selecting subgraphs and processors for processing a pending unit based on the policy with respect to pending units in the queue, wherein the profiling unit predicts and stores an operation execution time for each of at least one frequency in at least one processor available for each of the at least one subgraph.

The scheduler may, when receiving a request from at least one application, request and receive an operation execution time corresponding to each frequency of at least one processor at a time point of receiving the request to the profiling unit, and based on the received operation execution time, select subgraphs and processors suitable for processing the pending unit with respect to the pending unit in the queue.

The scheduler may, when an idling processor is detected among heterogeneous processors, perform scheduling of selecting the subgraph and the processor.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a flowchart of performing scheduling by using heterogeneous processors in a terminal according to an embodiment; and FIG. 10 is a diagram illustrating an example of selecting a subgraph in a scheduler when all processors are available

DETAILED DESCRIPTION

Figure 1:
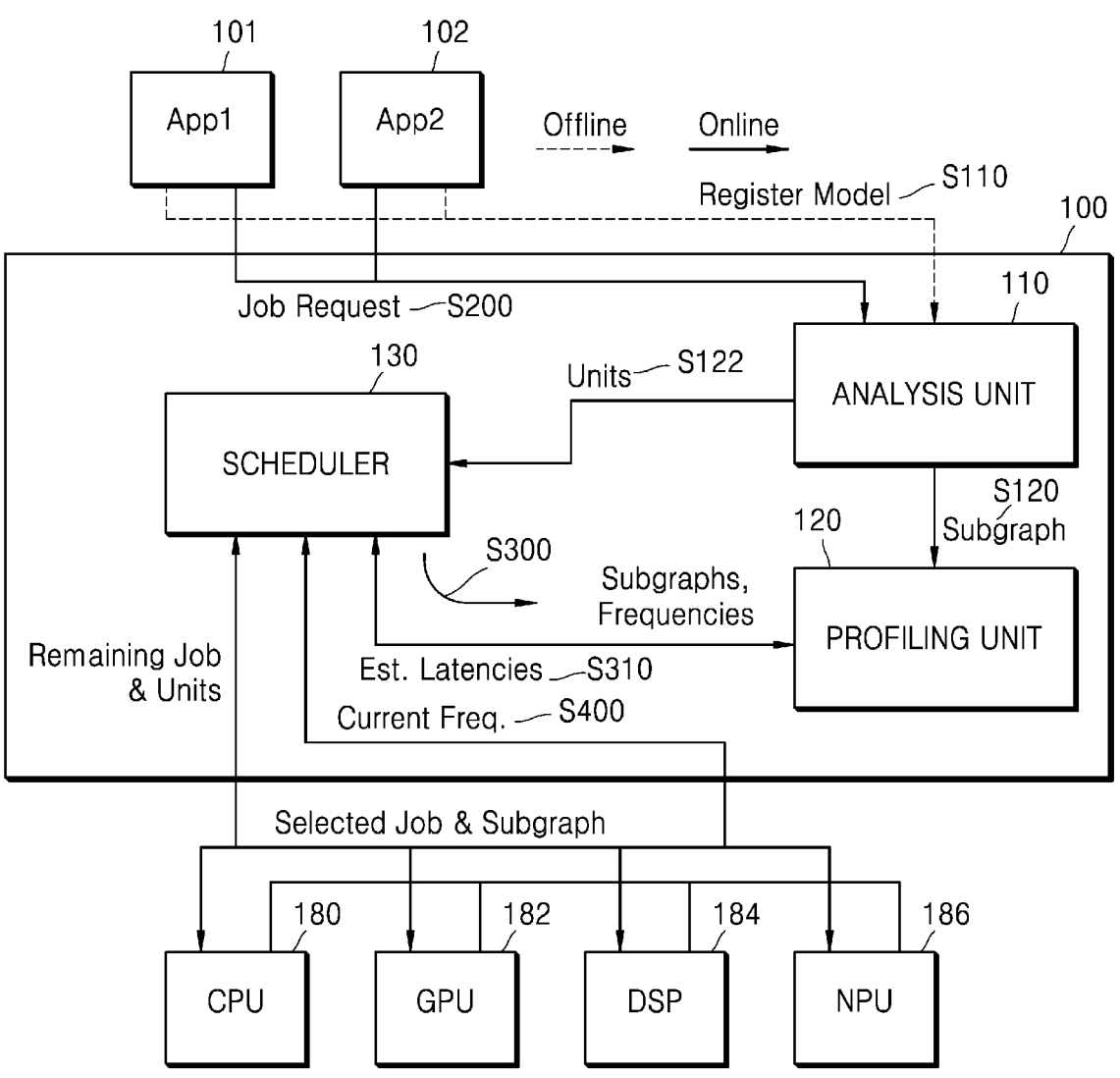
FIG. 1 is a diagram illustrating an internal configuration of a terminal performing scheduling by using heterogeneous processors, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions, such as "at least one of," when preceding a list of elements, modify the entire list of elements and do not modify the individual elements of the list.

Hereinafter, descriptions are given with reference to drawings.

FIG. 1 is a diagram illustrating an internal configuration of a terminal 100 that performs scheduling by using heterogeneous processors, according to an embodiment.

According to the embodiment, the terminal 100 may include heterogeneous processors 180, 182, 184, and 186. The heterogeneous processors 180, 182, 184, and 186 may include application processors (AP) used in a mobile device, and may include a central processing unit (CPU), a graphics processing unit (GPU), a neural processing unit (NPU), etc. In addition, the terminal 100 may further include random access memory (RAM), a memory communication unit, etc. The terminal 100 may include a mobile device, a smartphone, a smart TV, a smart watch, a notebook, internet of Things (IoT), a handheld device, a wearable device, a robot, a drone, etc.

Referring to FIG. 1, the terminal 100 may include an analysis unit 110, a profiling unit 120, and a scheduler 130. The terminal 100 may perform scheduling based on requests from a plurality of applications installed therein, and an occupied state and a frequency of a processor currently in use.

In an embodiment, the terminal 100 may use heterogeneous processors, such as the CPU, the GPU, the NPU, etc.

The terminal 100 may receive a deep neural network (DNN) deep learning model to be used by at least one of a first application App1 101 and a second application App2 102 installed in the terminal 100 (S110). Then, when the analysis unit 110 receives an operation request from the first and second applications App1 101 and App2 102 (S200), the analysis unit 110 may generate various operation plans to be used later by various processors by using the profiling unit 120, and predict and store operation execution times corresponding thereto. The scheduler 130 may select subgraphs and processors based on the request received from the first application App1 101 and the second application App2 102 and the operation execution times of the subgraphs predicted and stored in the profiling unit 120.

Each component will be described in more detail.

Figure 2:
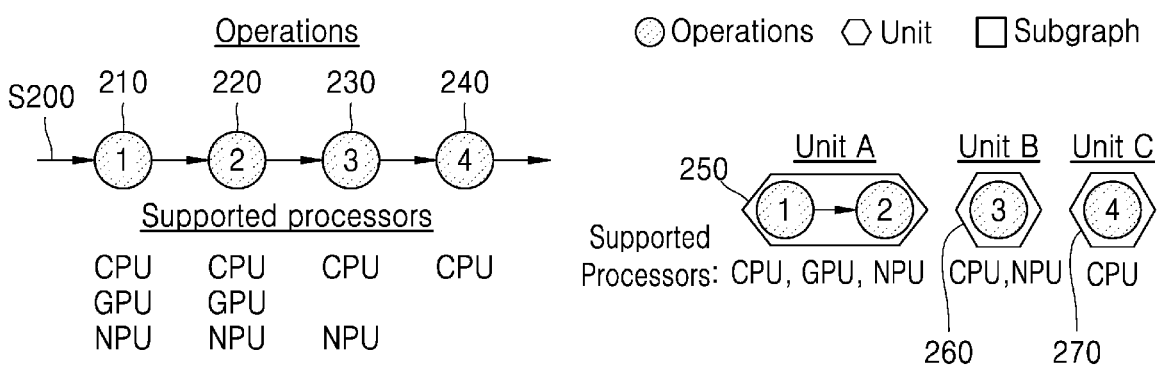
FIG. 2 is a diagram illustrating an example of partitioning, by an analysis unit, a received request into units, according to an embodiment.
Figure 3:
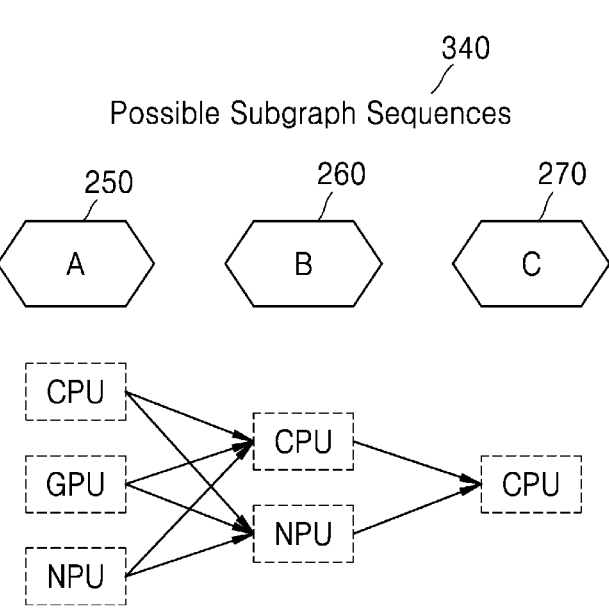
FIGS. 3 and 4 are diagrams illustrating subgraph sequences derivable from a plurality of units in FIG. 2, according to embodiments.
Figure 4:
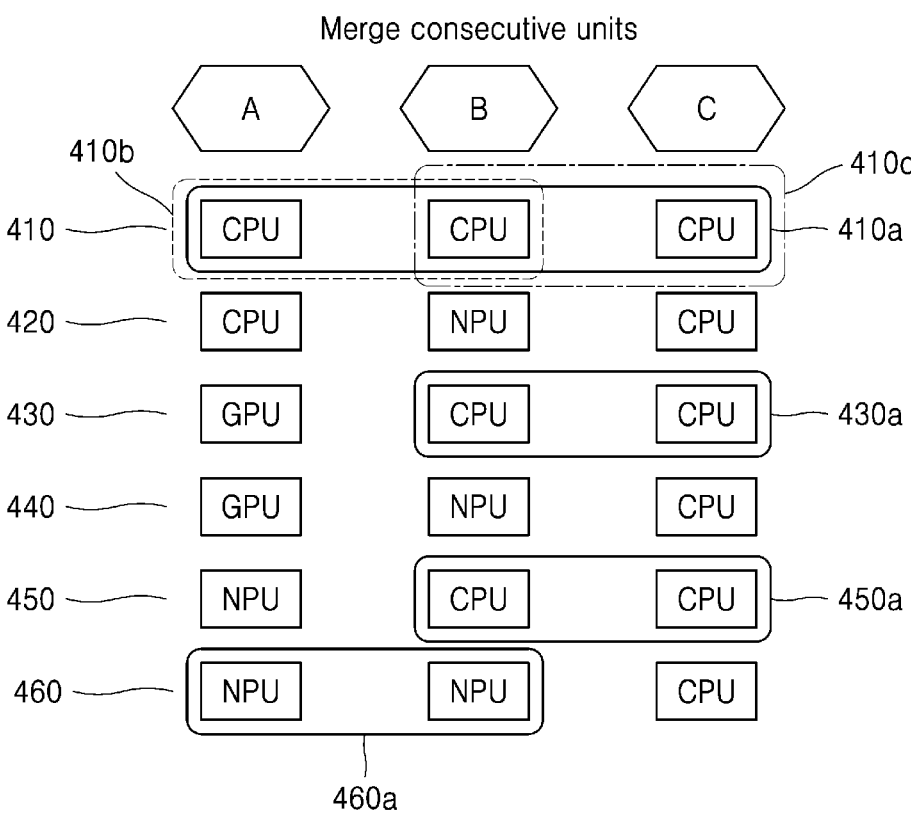
Figure 5:
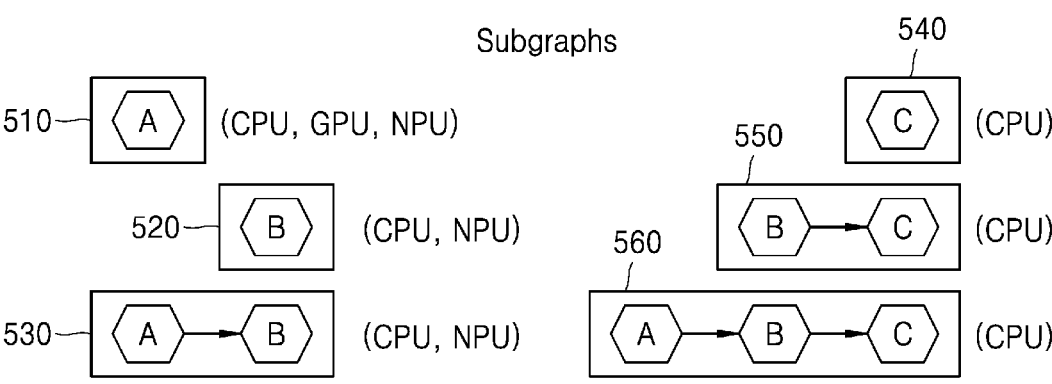
FIG. 5 is a diagram illustrating subgraphs derived by using the subgraph sequence of FIG. 4, according to an embodiment.

The analysis unit 110 will be described with reference to FIGS. 2 through 5. FIG. 2 is a diagram illustrating processors capable of performing each of four operations 210, 220, 230, and 240, and units that are combinations of operations to be performed by the same processor. FIGS. 3 and 4 diagrams illustrating subgraph sequences derivable from a plurality of units 250, 260, and 270 in FIG. 2. FIG. 5 is a diagram illustrating subgraphs derivable by using subgraph sequences 410 through 460 in FIG. 4.

In an embodiment, an operation plan may be obtained by collecting, in units, adjacent operations that can be processed by the same processor, among operations received from applications, and when the same processor can process the units again, the units are combined and generated as subgraphs, thereby reducing the number of unnecessary requests of acceleration processors.

The analysis unit 110 may receive the deep neural network deep learning model to be used by at least one of the first application App1 101 and the second application App2 102 installed in the terminal 100 (S110). In an embodiment, an application requiring deep neural network inference may not separately send an operation request to the processor, but may initially register a particular deep neural network deep learning model in the analysis unit 110 of the terminal 100 (S110), and send an operation request (S200).

At least one application installed in a terminal may include various applications, such as a face recognition application, a face detection application, an object detection application, and a hand tracking application. For example, the analysis unit 110 may receive a face detection deep neural network from the first application App1 101, and a deep neural network for object detection from the second application App2 102. In addition, when the first application App1 101 and the second application App2 102 use the same deep neural network deep learning model, a subgraph S120 generated by the analysis unit 110 may be shared.

According to an embodiment, referring to FIGS. 2 and 3, the analysis unit 110 may partition requests S200 received from at least one of the first application App1 101 and the second application App2 102 in units and separate the partitioned requests S200 into a plurality of units 250, 260, and 270. A unit may be referred to as a combination of operations performable by the same processor. In other words, operations within the same unit may be processed by one same processor.

The analysis unit 110 may derive a plurality of possible subgraph sequences 340 as shown in FIG. 3 based on the type of at least one processor capable of processing each of the separated plurality of units 250, 260, and 270.

The processors supporting an operation 1 210, an operation 2 220, an operation 3 230, and an operation 4 240 included in the request S200 received from the first application App1 101 and the second application App2 102 in the analysis unit 110 may be assumed as follows. The operation 1 210 and the operation 2 220 may be performed by CPU, GPU, and NPU. The operation 3 230 may be performed by CPU and NPU. And the operation 4 240 may be performed by CPU.

The analysis unit 110 may partition, in the received request S200, the operation 1 210 and the operation 2 220 into a unit A 250, the operation 3 230 into a unit B 260, and the operation 4 240 into a unit C 270.

The analysis unit 110 may generate the possible subgraph sequences 340 as shown in FIG. 3 based on the type of at least one processor capable of processing each of the unit A, the unit B 260, and the unit C 270.

The analysis unit 110 may derive six of the possible subgraph sequences 340 from the unit A 250, the unit B 260, and the unit C 270 in FIG. 2. FIG. 4 is a diagram illustrating six of the possible subgraph sequences 410 through 460, according to an embodiment.

A first subgraph sequence 410 may process all of the unit A 250, the unit B 260, and the unit C 270 by using CPU. A second subgraph sequence 420 may process the unit A 250 by using CPU, the unit B 260 by using NPU, and the unit C 270 by using CPU. A third subgraph sequence 430 may process the unit A 250 by using GPU, and the unit B 260 and the unit C 270 by using CPU. A fourth subgraph sequence 440 may process the unit A 250 by using GPU, the unit B 260 by using NPU, and the unit C 270 by using CPU. A fifth subgraph sequence 450 may process the unit A 250 by using NPU, and the unit B 260 and the unit C 270 by using CPU. A sixth subgraph sequence 460 may process the unit A 250 and the unit B 260 by using NPU, and the unit C 270 by using CPU.

In addition, the analysis unit 110 may combine different units continuously positioned in the possible subgraph sequences 340 (for example, 410*a* through 410*c*, 430*a*, 450*a*, and 460*a*). In this case, the analysis unit 110 may simply determine whether different units adjacent to each other can be performed by the same processor, and perform combining.

An example, in which the analysis unit 110 generates a subgraph based on units in the subgraph sequences 340 will be described with reference to FIGS. 4 and 5.

According to an embodiment, a subgraph may represent one unit or a combination of units continuously positioned and capable of being combined, that the same processor can process.

The analysis unit 110 may generate a third subgraph 530, a fifth subgraph 550, and a sixth subgraph 560 in the first subgraph sequence 410. The analysis unit 110 may, in the first subgraph sequence 410, determine that all of the unit A 250 processable by CPU, GPU, and NPU, the unit B 260 processable by CPU and NPU, and the unit C 270 processable by CPU may be processed by CPU, and by combining 410*a*, may generate the sixth subgraph 560. In addition, the analysis unit 110 may, in the first subgraph sequence 410, determine that the unit A 250 processable by CPU, GPU, and NPU, and the unit B 260 processable by CPU and NPU may be processed together by CPU, and by combining 410*b*, may generate the third subgraph 530. In addition, the analysis unit 110 may, in the first subgraph sequence 410, determine that only the unit B 260 processable by CPU and NPU, and the unit C 270 processable by CPU may be processed together by CPU, and by combining 410*c*, may generate the fifth subgraph 550.

The analysis unit 110 may generate, from the second subgraph sequence 420, a first subgraph 510, a second subgraph 520, and a fourth subgraph 540. The first subgraph 510 may be generated for the unit A 250, the second subgraph 520 may be generated for the unit B 260, and the fourth subgraph 540 may be generated for the unit C 270.

The analysis unit 110 may generate, from the third subgraph sequence 430, the first subgraph 510, the second subgraph 520, the fourth subgraph 540, and the fifth subgraph 550. The analyzer 110 may generate subgraphs in the same manner for fourth through sixth subgraph sequences 440 through 460. FIG. 5 is a diagram illustrating an example of subgraphs 510 through 560 generated from the subgraph sequences 410 through 460 in FIG. 4, respectively.

The profiling unit 120 will be described with reference to FIG. 8.

According to an embodiment, the profiling unit 120 may predict and store operation performance time per process or per subgraph based on subgraphs generated by the analysis unit 110.

The profiling unit 120 may receive all of the six subgraphs 510 through 560 illustrated in FIG. 5, and may predict and store an operation execution time for each of at least one processor capable of processing a subgraph for each subgraph. In this case, the profiling unit 120 may predict and store operation execution time for all available frequencies that is usable for each processor. It should be noted that only a portion of the six subgraphs 510 through 560 illustrated in FIG. 5 is shown in FIG. 8.

For example, when a plurality of frequencies are available for at least one processor 830 or 840, the profiling unit 120 may predict and store an operation execution time of a subgraph with respect to each of the plurality of frequencies.

Figure 8:
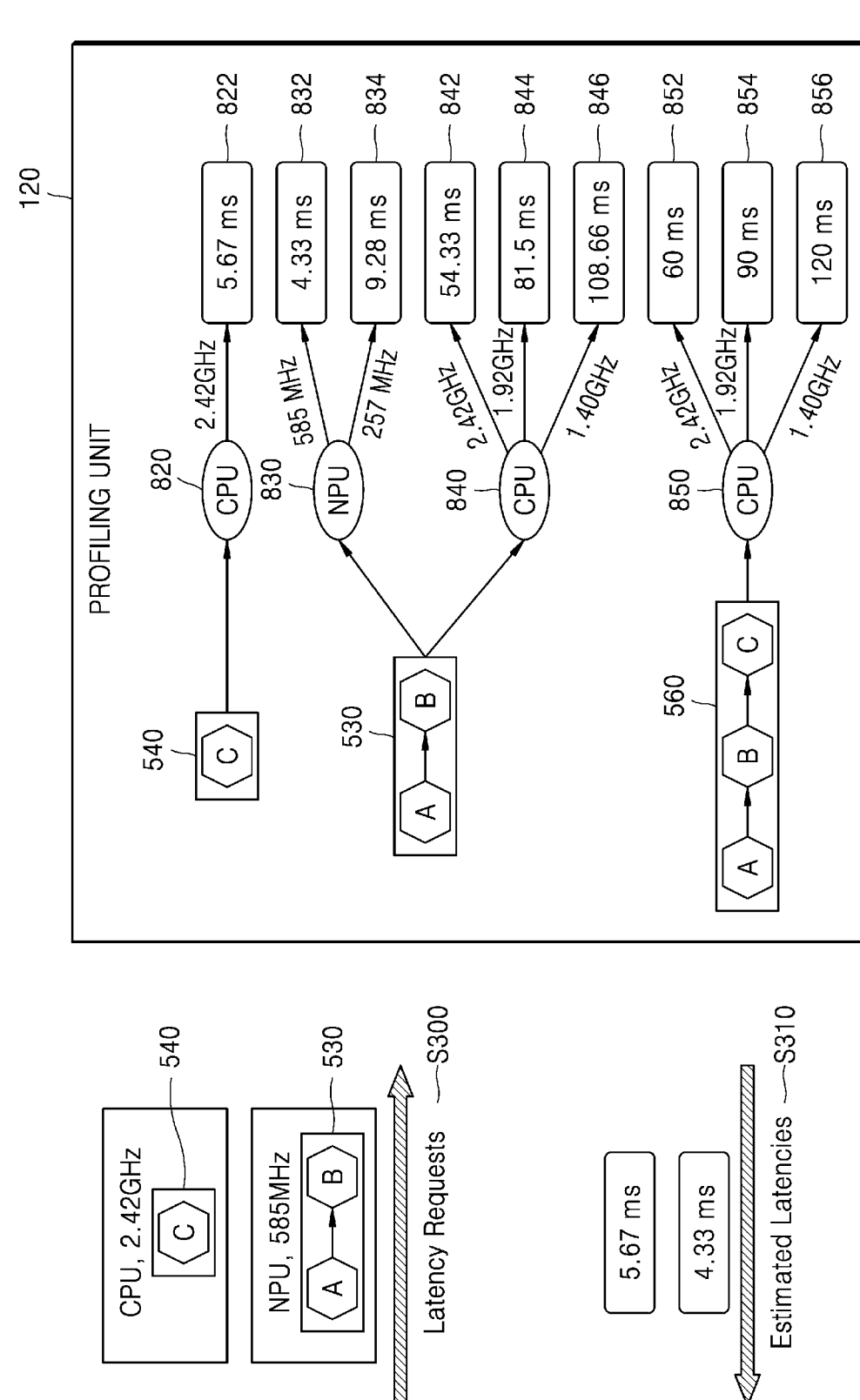
FIG. 8 is a diagram illustrating an example of transceiving an operation execution time between a profiling unit and a scheduler, according to an embodiment.

Referring to FIG. 8, a third subgraph 530 may processed by an NPU 830 or a CPU 840. In this case, the profiling unit 120 may predict and store operation execution times 832 and 834 required to process the third subgraph 530 at each of a plurality of frequencies available in the NPU 830, and operation execution times 842, 844, and 846 required to process the third subgraph 530 at each of a plurality of frequencies available in the CPU 840.

The profiling unit 120 may also predict and store an operation execution time at a particular frequency of a processor to process subgraphs for each subgraph.

Referring to FIG. 8, the profiling unit 120 may predict and store operation execution times of the NPU 830 and the CPU 840 for processing the third subgraph 530 at the available frequencies. In addition, the profiling unit 120 may predict and store operation execution times of the CPU 850 processor for processing the sixth subgraph 560 at available frequencies.

Examples, in which frequencies available in the CPU 850 processor are about 2.42 GHz, about 1.92 GHz, and about 1.40 GHz, will be examined. The profiling unit 120 may predict and store an operation execution time of the subgraph 560 at about 2.42 GHz of the CPU 850 processor as about 60 ms (852), an operation execution time of the subgraph 560 at about 1.92 GHz as about 90 ms (854), and an operation execution time of the subgraph 560 at about 1.40 GHz as about 120 ms (856).

According to an embodiment, the scheduler 130 may select a subgraph and a processor based on a request received from at least one application and at least one operation execution time stored for each subgraph in the profiling unit 120.

Figure 7:
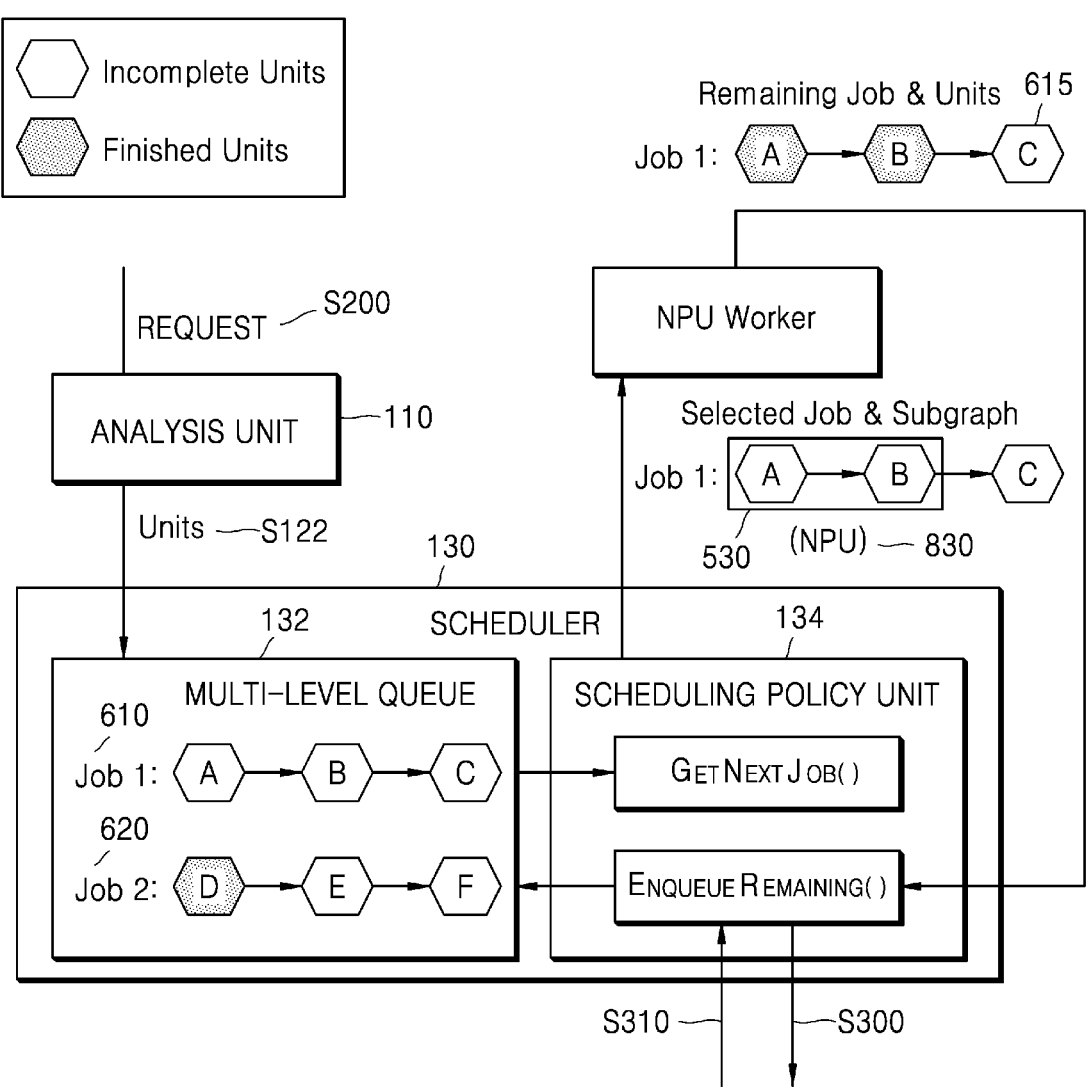
FIG. 7 is a diagram illustrating an example of a method of operating a scheduler, according to an embodiment.

Referring to FIG. 7, the scheduler 130 may include a multi-level queue 132 and a scheduling policy unit 134.

The multi-level queue 132 may include a plurality of queues for satisfying requests of various applications. Each queue may be assigned with a preset policy. In addition, priorities between policies assigned to each of the plurality of queues included in the multi-level queue 132 may be pre-defined.

The scheduler 130 may receive units S122, that are obtained by the analysis unit 110 dividing a request S200 received from at least one application, and input the unis S122 to the multi-level queue 132 with respect to types of units. The multi-level queue 132 may insert the units S122, which are obtained by partitioning the received request S200, into queues having policies corresponding to policies of the received request S200.

For example, it is assumed that the first application App1 101 receives a request with a latency deadline, and the second application App2 102 receives a best-effort request to be performed as quickly as possible. In a controller (e.g., a processor) of the terminal 100, priorities between the latency deadline policy and the best-effort policy are assigned in advance. For example, in the controller, the latency deadline policy may be given a first priority, and the best-effort policy may be given a second priority in advance. The deadline policy is a scheduling policy that considers application service-level objective.

In this case, the multi-level queue 132 may assign a request of the first application App1 101 to a first queue, and assign a request of the second application App2 102 to a second queue. It is assumed to be previously set that the first queue has a latency deadline policy, and the second queue has a best-effort policy.

The scheduling policy unit 134 may sequentially circulate the queues of the multi-level queue 132 according to a preset priority for each policy, and select a subgraph and a processor suitable for processing the pending units in the queue.

A function of the scheduler 130 will be described with reference to FIGS. 6 through 8.

Figure 6:
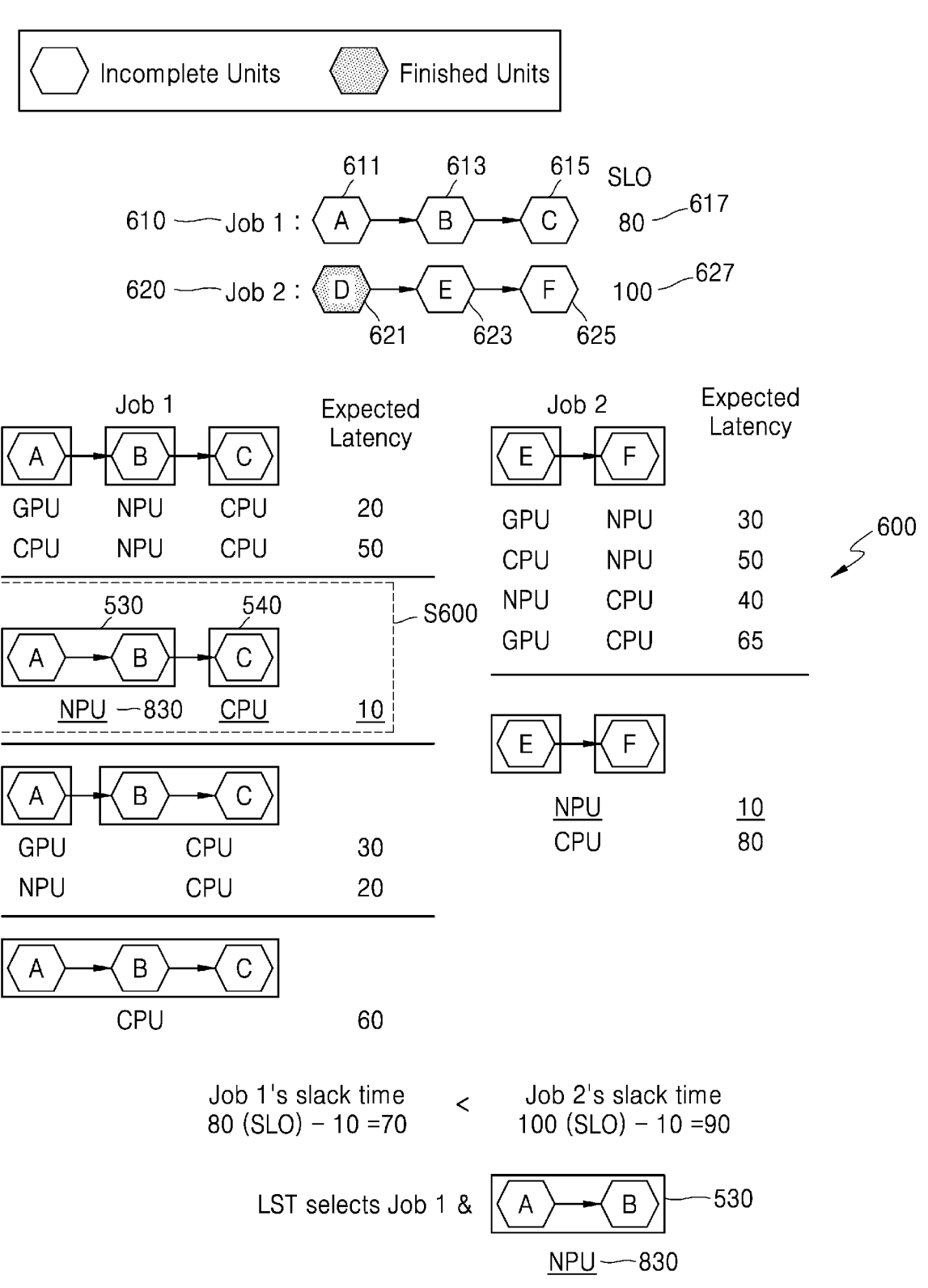
FIGS. 6 and 10 are diagrams illustrating examples of selecting subgraphs and processors in a scheduler, according to embodiments.
Figure 10:
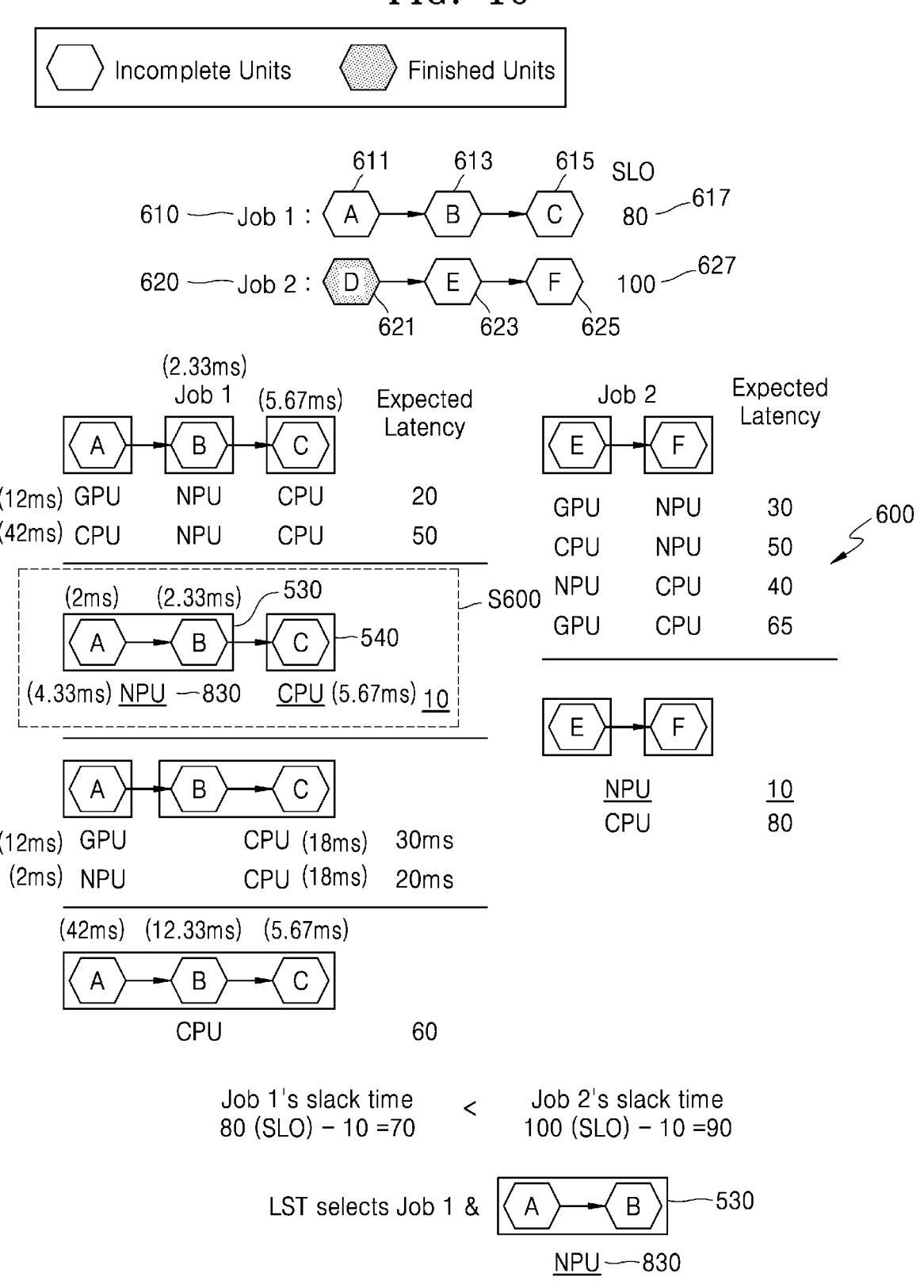

According to embodiments, FIG. 6 and FIG. 10 illustrate an example of selecting a subgraph in the scheduler 130 when all processors are available. FIG. 7 illustrates an example of a method of operating the scheduler 130, according to an embodiment. FIG. 8 illustrates an example of transceiving an operation execution time between the profiling unit 120 and the scheduler 130, according to an embodiment.

FIG. 6 illustrates a case in which the analysis unit 110 receives a first request 610 from the first application App1 101, and receives a second request 620 from the second application App2 102.

The first request 610 may be partitioned into a plurality of units (e.g., unit A 611, unit B 613, and unit C 615). It is assumed that the second request 620 is partitioned into a plurality of units (e.g., unit D 621, unit E 623, and unit F 625), and the unit D 621 has already been processed. In addition, it is assumed that the first request 610 and the second request 620 are requests having a latency deadline policy.

The scheduler 130 may insert the unit A 611, the unit B 613, and the unit C 615 into a queue corresponding to the policy of the first request 610 via the multi-level queue 132. In addition, the scheduler 130 may insert the unit D 621, the unit E 623, and the unit F 625 into a queue corresponding to the policy of the second request 620. In this case, the multi-level queue 132 may insert the first request 610 and the second request 620 into queues having latency deadlines as a policy, respectively. When the first request 610 and the second request 620 have the same policy, the multi-level queue 132 may insert the first request 610 and the second request 620 into the same queue.

The scheduling policy unit 134 may select a subgraph and a processor suitable for processing a pending unit in a queue based on the latency deadline policy. The scheduling policy unit 134 may receive current frequency information from at least one processor (e.g., 180, 182, 184, and 186 in FIG. 1) used in the terminal 100, transmit current frequency information received from the processor to the profiling unit 120, and request an operation execution time for a subgraph generated based on the plurality of units constituting the first request 610 and the second request 620.

For example, referring to FIGS. 6 and 10, when the first request 610 may be processed by using a subgraph 530 including the unit A 611 and the unit B 611, and a subgraph 540 including the unit C 614, the scheduling policy unit 134 may request an operation execution time corresponding to a current frequency (i.e., frequency at the time of receiving the request from the application) among available frequencies of the at least one processor capable of processing each of the subgraphs 530 and 540.

In the embodiment of FIG. 8, the profiling unit 120 may receive a request for the operation execution time S300, may transmit an operation execution time of about 4.33 ms 832 corresponding to a current frequency of about 585 MHz of the NPU 830 rather than operation execution times 832 and 834 of the NPU 830 processor for processing the subgraph 530 including the unit A 611 and the unit B 613 at other available frequencies, and may transmit an operation execution time of about 5.67 ms 822 S310 corresponding to a current frequency of about 2.42 GHz of a CPU 820 among available frequencies of the CPU 820 processor capable of processing the subgraph 540 including the unit C 615.

In addition, referring further to embodiments of FIGS. 6 and 10, when the first request 610 is processed by using the subgraph 530 including the unit A 611 and the unit B 613 and the subgraph 540 including the unit C 615, the scheduling policy unit 134 may predict the result as about 10 ms, that is a sum of the operation execution time of about 4.33 ms 832 of the case where the subgraph 530 including the unit A 611 and the unit B 613 is processed by NPU and the operation execution time of about 5.67 ms 822 of the case where the subgraph 540 including the unit C 615 is processed by the CPU (see S600).

The scheduling policy unit 134 may obtain an operation execution time table 600 including operation execution time information predicted for twelve subgraphs generated for the first request 610 and the second request 620 according to embodiments of FIGS. 6 and 10, by performing operations described above on each subgraph generated based on the plurality of units including each of the first request 610 and the second request 620. In addition, the scheduling policy unit 134 may select a subgraph and a processor based on policies of the first request 610 and the second request 620 and the operation execution time table 600.

Referring to FIGS. 6 and 10, when the first request 610 and the second request 620 are received, the scheduling policy unit 134 may select the subgraph 530 including the unit A 611 and the unit B 613 for the first request 610 and the NPU 830 processor, based on a latency deadline policy of the first request 610 and the second request 620 and the operation execution time table 600. When the subgraph 530 is processed by the NPU 830 processor, the scheduling policy unit 134 may insert the unit C 615 unprocessed in the first request 610 into a queue corresponding to a policy corresponding to the first request 610 in the multi-level queue 132, and perform the scheduling again. In the embodiment of FIG. 6, the policy corresponding to the first request 610 may be a latency deadline policy.

In the embodiments of FIGS. 6 and 10, the scheduling policy unit 134 may, according to the latency deadline policy, select subgraphs and processors (see S600) such that a slack time, which is obtained by subtracting the operation execution time from a sum of a limit time of about 80 ms 617 pending in the first request 610 and a limit time of about 100 ms 627 pending in the second request 620, is least.

In an embodiment of FIG. 7, an example is illustrated, in which, in GetNextJob( ) performing a function of the scheduling policy unit 134, the subgraph 530 including the unit A 611 and the unit B 613 is selected among the unit A 611, the unit B 613, and the unit C 615, and the unit D 621, the unit E 623, and the unit F 625, which have been inserted into a queue. The NPU Worker refers to a NPU processor, which is selected by a scheduler.

FIG. 9 illustrates a method of performing scheduling in the terminal 100, according to an embodiment. Descriptions will be given further referring to FIG. 1.

The analysis unit 110 may generate at least one subgraph S120 by partitioning the request S200 received from at least one of the first application App1 101 and the second application App2 102 based on units (S910).

The analysis unit 110 may transmit at least one subgraph S120 to the profiling unit 120, and transmit a plurality of units S122 that are obtained by partitioning the request S200 in units to the scheduler 130 (S920).

The scheduler 130 may insert a received plurality of units S122 into a queue having a policy corresponding to the request S200. The scheduler 130 may perform scheduling by selecting subgraphs and processors to process units pending in the queue based on the policy corresponding to the request S200 with respect to a pending unit in the queue and an operation execution time S310 predicted by the profiling unit 120 for each subgraph and pre-stored therein (S930). In this case, the scheduler 130 may perform scheduling with reference to a current frequency S400 of each processor received from at least one processor 180, 182, 184, and 186.

An operation of a method according to an embodiment may be implemented as a computer-readable program or code on a computer-readable recording medium. The computer readable recording medium may include all types of recording devices readable by a computer system. In addition, the computer-readable recording medium may be distributed to computer systems connected to each other in a network, and may store and execute the computer-readable program or code in a distribution manner.

In addition, the computer-readable recording medium may include a hardware device particularly configured to store and execute program instructions, such as read-only memory (ROM), random access memory (RAM), a flash memory, etc. Some or all of operations by using a degree of freedom conversion method disclosed in the disclosure may be performed by (or using) a hardware device, such as a microprocessor, a programmable computer, and an electronic circuit.

According to an embodiment, a method of performing scheduling in a terminal may perform scheduling efficiently and processing a request for a deep neural network operation from various applications by using heterogeneous processors.

In an embodiment, an operation plan may be performed by collecting adjacent operations in units, that the same processor may process, among operations received in an application, and when the units are processed by the same processor again, the number of requests of unnecessary acceleration processors may be reduced by combining the units and generating as subgraphs.

According to an embodiment, a method of performing scheduling in a terminal may improve utilization of processors by dynamically using various processors, and accordingly, preventing performance degradation caused by unnecessary resource contention.

According to an embodiment, a method of performing scheduling in a terminal may perform accurately scheduling by predicting an operation execution time by reflecting a processor clock frequency, and using an operation execution time considering a current frequency of a processor when actual scheduling is performed.

According to an embodiment, a method of performing scheduling in a terminal may be used for performing real-time analysis on a real world around a user in an extended reality (XR) application using the terminal.

At least one of the components, elements or units (collectively "components" in this paragraph) represented by a block in the drawings, such as the analysis unit 110, the profiling unit 120, and the scheduler 130 illustrated in FIG. 1 may be embodied as various numbers of hardware, software and/or firmware structures that execute respective functions described above, according to an exemplary embodiment. For example, at least one of these components may use a direct circuit structure, such as a memory, processing, logic, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions. Also, at least one of these components may further include a processor such as a central processing unit (CPU) that performs the respective functions, a microprocessor, or the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A terminal performing scheduling comprising:
a plurality of processors;
a memory storing instructions, wherein the instructions, when executed by one of the plurality of processors, cause the terminal to:
execute an analysis unit to partition a request received from at least one application into units and generate a plurality of subgraphs, each subgraph including one or more of the units;
execute a profiling unit to receive the plurality of subgraphs, and determine an operation execution time for each of the plurality of processors to process each of the received subgraphs; and execute a scheduler to assign at least one subgraph of the received subgraphs to at least one processor based on the operation execution time, wherein the scheduler is further executed to:

receive a current frequency of each of the at least one processor and transmit the current frequency of each of the at least one processor to the profiling unit;

request, from the profiling unit, an operation execution time corresponding to the current frequency, among available frequencies of the at least one processor, capable of processing the at least one subgraph, and receive, from the profiling unit, the operation execution time; and select subgraphs and processors based on predicted operation execution time corresponding to the current frequency, wherein the analysis unit is further executed to derive a plurality of subgraph sequences based on types of the processors capable of processing each of the units, and generate the subgraphs by combining consecutive units in each of the subgraph sequences, and wherein, when the consecutive units are processable by a same processor, the consecutive units are combined into the subgraphs.

2. The terminal of claim 1, wherein the scheduler comprises:

a multi-level queue to insert the units into a queue having a same policy as the request; and a scheduling policy unit executed to select the at least one subgraph and the at least one processor suitable for processing a pending unit in the queue.

3. The terminal of claim 2, wherein the multi-level queue comprises a plurality of queues having different policies, and is further to select the queue according to a preset policy-related priority.

4. The terminal of claim 1, wherein the plurality of processors comprises at least two of a central processing unit (CPU), a neural processing unit (NPU), and a graphics processing unit (GPU).

5. The terminal of claim 1, wherein the analysis unit is further executed to generate each of the units by grouping operations in the request which are processable by a same processor.

6. The terminal of claim 1, wherein the profiling unit is further executed to determine the operation execution time for each of available frequencies of the processors.

7. A method of performing scheduling in a terminal, the method comprising:

generating, by an analysis unit, a plurality of subgraphs by partitioning a request received from at least one application into a plurality of units;

transmitting, by the analysis unit, the plurality of subgraphs to a profiling unit;

transmitting, by the analysis unit, the plurality of units to a scheduler;

determining, by the profiling unit, an operation execution time for each of a plurality of processors to process each of the subgraphs;

performing, by the scheduler, scheduling by inserting the plurality of units into a queue having a same policy as the request; and assigning, by the scheduler, at least one subgraph of the subgraphs to at least one processor of the plurality of processors for processing a pending unit in the queue based on the operation execution time, wherein the assigning comprises:

receiving a current frequency of each of the at least one processor and transmitting the current frequency of each of the at least one processor to the profiling unit;

requesting, from the profiling unit, an operation execution time corresponding to the current frequency, among available frequencies of the at least one processor, capable of processing the at least one subgraph, and receiving, from the profiling unit, the operation execution time; and selecting subgraphs and processors based on predicted operation execution time corresponding to the current frequency, wherein the analysis unit is executed to derive a plurality of subgraph sequences based on types of the processors capable of processing each of the units, and generate the subgraphs by combining consecutive units in each of the subgraph sequences, and wherein, when the consecutive units are processable by a same processor, the consecutive units are combined into the subgraphs.

8. The method of claim 7, wherein the scheduler, when an idling processor is detected among the processors, performs the scheduling.

9. A non-transitory computer-readable recording medium for implementing a program of a method of performing scheduling in the terminal of claim 1.

* * * * *